United States Patent
Gayles

(10) Patent No.: US 9,069,332 B1
(45) Date of Patent: Jun. 30, 2015

(54) USER DEVICE PROVIDING ELECTRONIC PUBLICATIONS WITH READING TIMER

(75) Inventor: Edward J. Gayles, Tracy, CA (US)

(73) Assignee: Amazon Technologies, Inc., Reno, NV (US)

( * ) Notice: Subject to any disclaimer, the term of this patent is extended or adjusted under 35 U.S.C. 154(b) by 1067 days.

(21) Appl. No.: 13/115,861

(22) Filed: May 25, 2011

(51) Int. Cl.
- *G04F 1/00* (2006.01)
- *G04F 3/00* (2006.01)
- *G04F 5/00* (2006.01)
- *G04F 10/00* (2006.01)

(52) U.S. Cl.
CPC ..................................... *G04F 10/00* (2013.01)

(58) Field of Classification Search
USPC .......................................................... 702/176
See application file for complete search history.

(56) References Cited

U.S. PATENT DOCUMENTS

| | | | |
|---|---|---|---|
| 5,256,067 A | 10/1993 | Gildea et al. | |
| 5,876,334 A | 3/1999 | Levy | |
| 5,957,699 A | 9/1999 | Peterson et al. | |
| 6,086,382 A | 7/2000 | Thomas | |
| 6,361,322 B1 | 3/2002 | Linden Henry | |
| 6,409,513 B1 | 6/2002 | Kawamura et al. | |
| 6,561,812 B1 | 5/2003 | Burmester et al. | |
| 6,869,287 B1 | 3/2005 | Tadlock et al. | |
| 7,114,126 B2 | 9/2006 | Berger et al. | |
| 7,286,793 B1 | 10/2007 | Miele | |
| 7,293,025 B1 | 11/2007 | Harouche | |
| 7,455,522 B2 | 11/2008 | Polanyi et al. | |
| 7,464,023 B2 | 12/2008 | Parry et al. | |
| 7,568,160 B2 | 7/2009 | Berger et al. | |
| 8,517,738 B2 | 8/2013 | Sheehan et al. | |
| 2003/0017442 A1 | 1/2003 | Tudor et al. | |
| 2003/0027122 A1 | 2/2003 | Stansvik | |
| 2003/0068603 A1 | 4/2003 | Cupp | |
| 2003/0227479 A1 | 12/2003 | Mizrahi et al. | |
| 2004/0067472 A1 | 4/2004 | Polanyi et al. | |
| 2004/0110120 A1 | 6/2004 | Ho et al. | |
| 2004/0219502 A1 | 11/2004 | Bechard et al. | |
| 2006/0008781 A1 | 1/2006 | Townshend et al. | |
| 2006/0063139 A1 | 3/2006 | Carver et al. | |
| 2006/0084047 A1 | 4/2006 | Chiu et al. | |
| 2007/0238077 A1 | 10/2007 | Strachar | |
| 2007/0269788 A1 | 11/2007 | Flowers et al. | |
| 2008/0096171 A1 | 4/2008 | Movahhedi | |
| 2008/0108029 A1 | 5/2008 | Luke et al. | |
| 2008/0138787 A1 | 6/2008 | Weinstein | |
| 2012/0001923 A1* | 1/2012 | Weinzimmer et al. | 345/473 |
| 2012/0231441 A1 | 9/2012 | Parthasarathy et al. | |

OTHER PUBLICATIONS

Final Office Action mailed Nov. 1, 2013 in U.S. Appl. No. 12/890,532.
Non-final Office Action mailed Jan. 15, 2013 in U.S. Appl. No. 12/890,532.
Notice of Allowance mailed Apr. 23, 2014 in U.S. Appl. No. 12/890,532.

* cited by examiner

*Primary Examiner* — Toan Le
*Assistant Examiner* — Manuel Rivera Vargas
(74) *Attorney, Agent, or Firm* — Lowenstein Sandler LLP

(57) ABSTRACT

A user device determines a rate of consumption value for each of a plurality of measurable units of an electronic publication. The user device calculates a running average of the rate of consumption values and provides a feature based on the running average.

22 Claims, 7 Drawing Sheets

USER DEVICE PROVIDING ELECTRONIC PUBLICATIONS WITH READING TIMER

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like. Currently, most electronic devices do not offer the feature of determining a rate of consumption of electronic media. Some additional features that may be added to electronic devices used for the consumption of electronic media is provided in the detailed description of this application.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a user device providing electronic publications that incorporates a reading timer. In one embodiment, a consumption rate monitoring module of the user device determines a rate of consumption value for each of a plurality of measurable units of an electronic publication. The user device calculates a running average of the rate of consumption values and provides a feature based on the running average. For example, the feature may include an estimate of an amount of time remaining for the user to complete consumption of the electronic publication.

Figure 1:
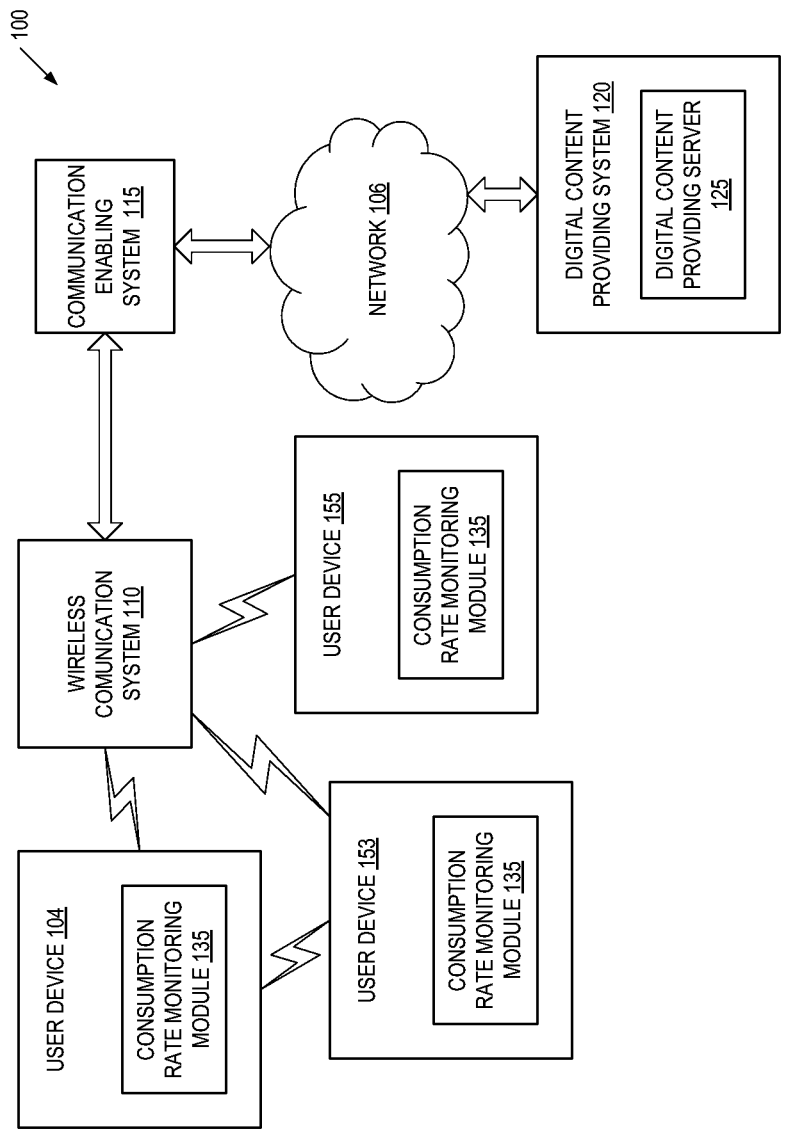
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 104, 153, 155 capable of communicating with the digital content providing system 120 via a network 106. Network 106 may include, for example, a public network such as the Internet or a private network such as a local area network (LAN).

The user devices 104, 153, 155 may be portable computing devices such as electronic book readers or tablet computers (e.g., that include a book reader application). Other examples of portable computing devices include cellular telephones, personal digital assistants (PDAs), portable media players, netbooks, and the like. The user devices 104, 153, 155 may also be non-portable computing devices such as a desktop computer, a set-top box associated with a television, a gaming console, and so on. The user devices 104, 153, 155 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), and multi-media content.

The digital content providing system 120 may correspond to any feature or combination of features for providing electronic media items or other digital content to the user devices 104, 153, 155. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic publications (e.g., electronic books) to users upon the users' purchase of the items. In this role, the digital content providing server 125 may essentially act as a bookseller or the like. In other cases, the digital content providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 104, 153, 155 receive, electronic publications (or other media items), search results, upgrades, and/or other information via the network 106. For example, the user devices 104, 153, 155 may download or receive ebooks from the digital content providing server 125. The digital content providing server 125 may also receive various requests (e.g., search queries), instructions and other data from the user devices 104, 153, 155 via the network 106.

Communication between the user devices 104, 153, 155 and the item providing system 120 may be enabled via any communication infrastructure. One example of such an infrastructure includes a combination of a wide area network (WAN) and wireless infrastructure, which allows a user to use the user devices 104, 153, 155 to purchase digital content (e.g., electronic publications) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 104, 153, 155.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 104, 153, 155 may also wirelessly connect to other user devices 104, 153, 155. For example, user device 104 may form a wireless ad hoc (peer-to-peer) network with user device 153 using WiFi, Bluetooth, or other wireless communication protocols.

In one embodiment, user device 104, 153, 155 each include a consumption rate monitoring module 135. Consumption rate monitoring module 135 may assist a user in determining and/or improving a rate of consumption of digital content, such as a reading speed of an ebook or other electronic media. Consumption rate monitoring module 135 tracks and analyzes a user's reading behavior, and provides selected features based on the reading behavior. For example, consumption rate monitoring module 135 may determine a user's average reading speed and estimate an amount of time it will take the user to finish reading the ebook. Consumption rate monitoring module 135 may also exchange information with consumption rate monitoring modules 135 in other user devices 104, 153, 155 to share or accumulate information on the reading behavior of multiple users. In addition, consumption rate monitoring module 135 may provide features to assist a user in improving his or her reading speed. Consumption rate monitoring module 135 is described in greater detail with reference to FIG. 2 below.

Figure 2:
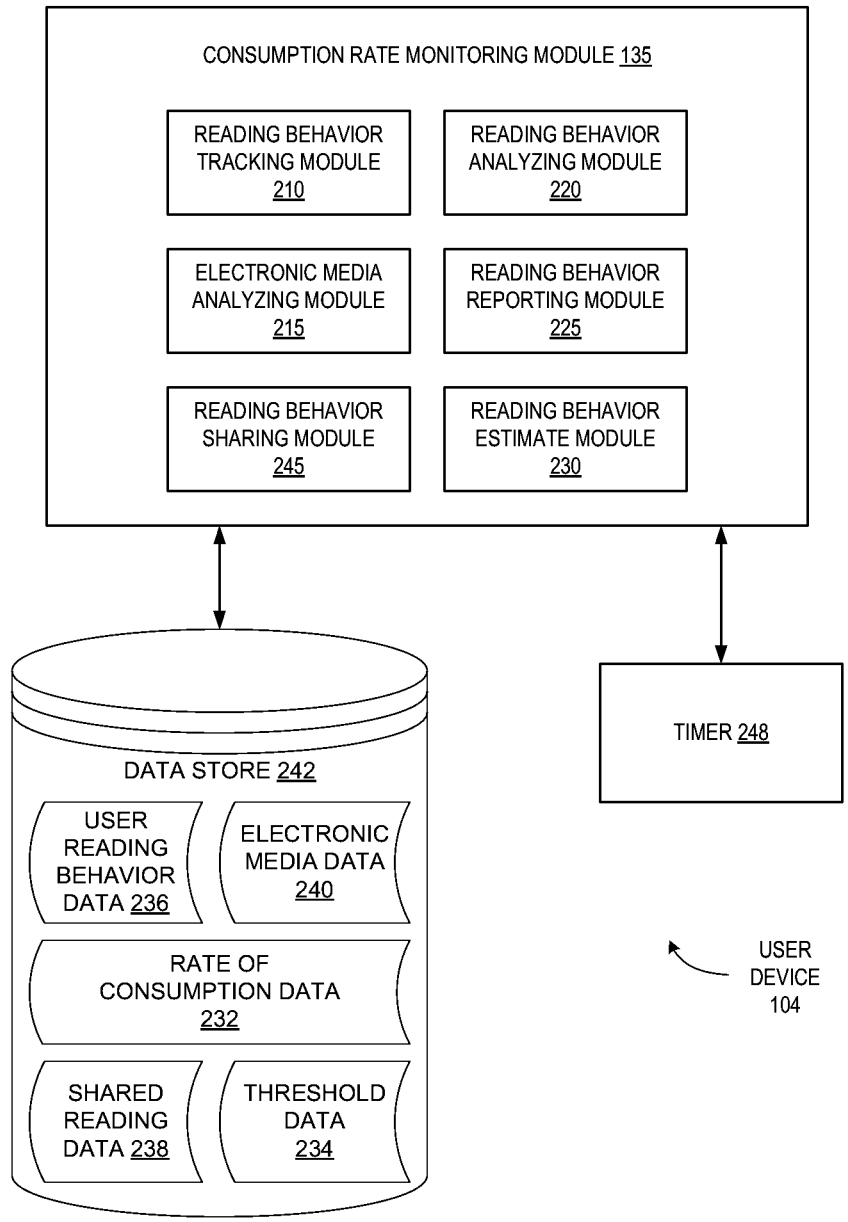
FIG. 2 is a block diagram illustrating a consumption rate monitoring module, according to an embodiment.

FIG. 2 is a block diagram of one embodiment of a consumption rate monitoring module 135 that is included in a user device, which may correspond to consumption rate monitoring module 135 of FIG. 1. In one embodiment, user device 104 includes consumption rate monitoring module 135, which may include reading behavior tracking module 210, electronic media analyzing module 215, and reading behavior analyzing module 220. In other embodiments, consumption rate monitoring module 250 may also include reading behavior reporting module 225, reading behavior estimate module 230, and reading behavior sharing module 245. In one embodiment, consumption rate monitoring module 135 is connected to a data store 242, which may be a file system, database or other data management layer resident on a data storage device such as a disk drive, RAM, ROM, database, etc.

Reading behavior tracking module 210 tracks a user's reading behavior while the user reads (or otherwise consumes) an active electronic publication or other piece of electronic media (e.g., an ebook). Reading behavior tracking module 210 may record the user's reading behavior data 236 in data store 242. In one embodiment, the reading behavior may include a user's rate of consumption of a piece of electronic media (i.e., the user's reading speed). The user device may include a timer 248. The timer 248 may be a component of the consumption rate monitoring module 135, or may be external to the consumption rate monitoring module 135, as shown. Reading behavior tracking module 210 can track the amount of time that a user spends consuming a particular portion of the electronic media using the timer 248. For example, reading behavior tracking module 210 may start timer 248 when a portion (e.g., one page) of an electronic publication is initially displayed, and stop the timer 248 when the user issues a change page command. In one embodiment, the timer 248 may be delayed to account for the rendering or refresh time of a display of the user device, or reading behavior tracking module may otherwise account for any delay that may occur. Thus, reading behavior tracking module 210 can determine how much time the user spends reading each portion of content and/or how many portions of the content the user finishes reading.

The portion of content which the timer measures may vary in different embodiments and may be configurable by the user. Each portion may represent a measurable unit of the media content and may include, for example, characters, words, lines, sentences, paragraphs, pages, chapters, sections, books, images, any other measurable unit, or any combination of these units. Electronic publications may have variable sized fonts, and the user device can re-page material based on the amount of text that can fit on a single page using a selected font size. Additionally, the user device may divide the text of electronic publications into pages based on contents of the text. For example, if a specific portion of the text deals with a particular topic, then that portion of the text may be included in a separate page than other adjacent text that deals with another topic. This may be the case even if there is space for text discussing both topics to be displayed on a single page at a current chosen font size. These or other variations may affect the portion of content being measured, and in turn affect the reading behavior measurement.

Electronic media analyzing module 215 may analyze the active electronic media publication to identify factors that may affect the portion of content being measured. For example, electronic media analyzing module 215 may examine the electronic publication to determine a number of words displayed on a screen at one time with the current font size. Electronic media analyzing module 215 may be configured to determine this directly from the electronic publication and store the information as electronic media data 240. In another embodiment, electronic media analyzing module 215 may obtain the information from electronic media data 240 in data store 242. Electronic media data 240 may be previously created by consumption rate monitoring module 135 or may be created by some other application or program and may be updated when changes occur to the electronic publication, such as a change in font size as discussed above. In other embodiments, electronic media analyzing module 215 may determine other information or characteristics of the electronic publication, such as, a number of chapters or sections in the publication, the number of pages in the publication, the number of characters or words in a sentence, page, or paragraph, the number of images on a page, or the like. The electronic media data may also include information on a level of difficulty of the contents for portions of the electronic media being read. For example, a newspaper or magazine article may be given a lower level of difficulty, while a textbook or scientific journal may be given a higher difficulty rating.

Reading behavior analyzing module 220 may analyze data from data store 242 to determine a rate of consumption value (e.g., a reading speed). Reading behavior analyzing module 220 may read user reading behavior data 236 and electronic media data 240 from data store 242. In one embodiment, user reading behavior data 236 may include a number of pages or screens viewed by the user and a time that the user spent viewing each page or screen. Electronic media data 240 may include characteristics of the electronic publication, at the time the user reading behavior data 236 was collected, such as a number of words displayed on each page or screen viewed by the user. Using reading behavior data 236 and electronic media data 240, reading behavior analyzing module 220 may determine a rate of consumption value, which may be expressed, for example, in words per minute. In other embodiments, the rate of consumption value may be expressed differently, using different measureable units (e.g., characters, pages, chapters) and/or time values (e.g., seconds, milliseconds, hours). Reading behavior analyzing module 220 may determine a rate of consumption value for each measurable unit of the electronic media for which user reading behavior data 236 was stored in data store 242. Reading behavior analyzing module 220 may store the rate of consumption value(s) as rate of consumption data 232 in data store 242.

In one embodiment, reading behavior analyzing module 220 may combine the stored rate of consumption values for each measureable unit to determine an average rate of consumption value. The average may be calculated as the arithmetic mean of the stored rate of consumption values in rate of consumption data 232, however in other embodiments, reading behavior analyzing module may also calculate the median value, the mode value, or some other value. The calculated average rate of consumption value may also be stored in rate of consumption data 232 of data store 242. The average may be a running average, such that it is continuously updated each time a new rate of consumption value is determined for another measurable unit of the electronic publication. In one embodiment, each rate of consumption value may be compared to a threshold value before being included in the running average. For example, if a rate of consumption value deviates from the current average by more than a threshold amount (e.g., faster or slower by more than the threshold amount), then the reading behavior analyzing module 220 may disregard that value rather than including it in the running average. A rate of consumption value may deviate from the average by more than the threshold amount, for example, if a user is quickly turning through pages of the electronic publication or if the user has stopped reading the electronic publication for a period of time. The threshold value may be set to a default value or may be user configurable and may be stored in data store 242 as threshold data 234.

In one embodiment, the running average stored in rate of consumption data 232 may be calculated for one user and for the current piece of electronic media being read. Thus, the average rate of consumption value would represent the user's average reading speed for the current electronic media. In another embodiment, another running average may be stored that includes rate of consumption values for multiple pieces of electronic media. This may include, for example, all of the books that the user has read in the past, other pieces of similar electronic media, or some other combination. When different pieces of electronic media are included in the average calculation, the rate of consumption values may be weighted based on the level of difficulty of the electronic media. In yet another embodiment, reading behavior data may be shared by multiple users on the same or different user devices. If multiple users share the same user device, there may be more than one user reading behavior data 236 and that data may be used to calculate the average rate of consumption value in rate of consumption data 232. Rate of consumption monitoring module 135 may also include reading behavior sharing module 245 which enables the sharing of reading behavior data over a network, as described above with respect to FIG. 1. Thus, reading behavior data from multiple users on different user devices may be combined to form an average rate of consumption value for a particular electronic publication. The shared reading behavior data received by reading behavior sharing module 245 may be stored as shared reading data 238 in data store 242.

In one embodiment, the user device may include one or more sensors such as touch sensors, proximity sensors or motion sensors that the user device can use to identify whether the user device is being held by a user. If the reading behavior analyzing module 220 determines that a user is taking an uncharacteristically long time reading through a portion of text, it may check data from the sensors to determine whether the user device is being held by a user. If the user device is not being held by a user and no page turn signal has been sent to the user device for a threshold period of time, the reading behavior analyzing module 220 may determine that the user is not currently reading the current portion of text, and stop the timer 248 and/or deduct time from the timer 248.

In one embodiment, the user device includes an optical sensor that tracks user eye movement. Reading behavior tracking module 210 may then correlate the user eye movement to currently displayed portions of text. This information may be used to more accurately identify how a user is progressing through particular portions of reading, whether a user is nodding off (e.g., if eyes are detected to be closed or droopy), or whether a user is not looking at the user device (in which case the timer 248 can be paused). Thus, the optical sensor can be used to determine when a user has completed reading a portion of the electronic media rather than using a page turn signal.

In one embodiment, reading behavior reporting module 225 may report a user's reading behavior (e.g., user reading behavior data 236), and/or rate of consumption data 232 to an item providing system, such as digital content providing system 120 of FIG. 1. The item providing system may then aggregate this information with reading behavior and rate of consumption information from other users. Item providing system may also suggest additional pieces of electronic media and/or provide estimated reading times for the additional electronic media.

In one embodiment, consumption rate monitoring module 135 further includes an additional module(s) designed to implement various desired features based on the rate of consumption. One example is reading behavior estimate module 230. Reading behavior estimate module 230 may be configured to provide an estimate of the remaining reading time for the current electronic publication. Reading behavior estimate module 230 may read electronic media data 240, which may contain information about the current electronic publication, and rate of consumption data 232. Reading behavior estimate module 230 may calculate how long it may take the user to finish reading the electronic publication based on the average rate of consumption and the number of measureable units left in the electronic publication. In other embodiments, consumption rate monitoring module 135 may include additional modules configured to implement other functionalities.

In one embodiment, a module may compare the current average rate of consumption to a target reading speed provided by the user and determine how far off the actual reading speed is, what increase in reading speed is needed to reach the target, etc. In order to assist a user in increasing his or her reading speed, a module may automatically turn the page of the electronic publication after a specified period of time in order to force the user to read at a certain rate. This period of time and/or rate of consumption may be user configurable. In another embodiment, text may be highlighted, starting at the beginning of the page and continuing to the end, corresponding to a target rate of consumption, so that a user may see how fast they must read to reach their target.

In another embodiment, the determined average rate of consumption may be used to estimate how far a user will read in an electronic publication in a predetermine amount of time. For example, the user may specify that they have one hour (or some other period of time) in which to read an ebook. The user may input the time period and, based on the average rate of consumption and the number of measureable units in the electronic publication, reading behavior estimate module 230 may determine that that the user is likely to finish reading a certain portion, or the entirety, of the electronic publication in that time period. The portion may be specified, for example, as a certain number of chapters, sections, pages, words, characters, etc. The estimate may be displayed to the user on a display of the user device.

Figure 3:
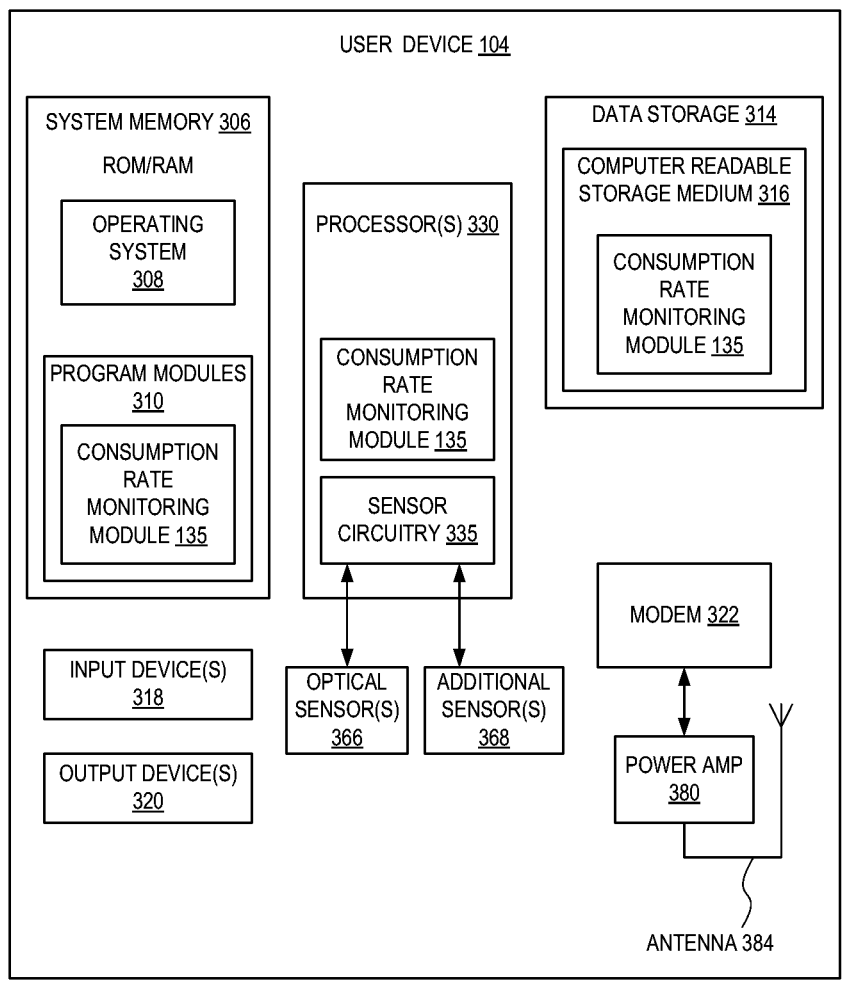
FIG. 3 is a block diagram illustrating an exemplary user device, according to an embodiment.

FIG. 3 is a block diagram illustrating an exemplary user device 104. In one embodiment, the user device 104 may correspond to one or all of the user devices 104, 153, 155 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 104 includes one or more processors 330, such as one or more CPUs, microcontrollers, field programmable gate arrays, or other types of processors. The user device 104 also includes system memory 306, which may correspond to any combination of volatile and/or non-volatile storage mechanisms. The system memory 306 stores information which provides an operating system component 308, various program modules 310 such as consumption rate monitoring module 135, and/or other components. The user device 104 performs functions by using the processor(s) 330 to execute instructions provided by the system memory 306.

The user device 104 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the consumption rate monitoring module 135 may reside, completely or at least partially, within the computer readable storage medium 316, system memory 306 and/or within the processor(s) 330 during execution thereof by the user device 104, the system memory 306 and the processor(s) 330 also constituting computer-readable media. In one embodiment, data storage 314 includes data store 242 of FIG. 2. The user device 104 may also include one or more input devices 318 (keyboard, mouse device, specialized selection keys, etc.) and one or more output devices 320 (displays, printers, audio output mechanisms, etc.).

The user device 104 further includes a wireless modem 322 to allow the user device 104 to communicate via a wireless network (e.g., such as provided by the wireless communication system) and/or with other computing devices, such as remote computers, the item providing system, online book stores, electronic catalogs for libraries, and so forth. The wireless modem 322 may allow the user device 104 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 322 may generate signals and send these signals to power amplifier (amp) 380 for amplification, after which they are wirelessly transmitted via antenna 384. In addition to sending data, antenna 384 also receives data, which is sent to wireless modem 322 and transferred to processor(s) 330.

In one embodiment, user device 104 includes an optical sensor 366. The optical sensor 366 may be a low resolution camera (e.g., having 0.2 or 0.3 Megapixels) that takes images (e.g., of a user's eyes) on a periodic basis. Alternatively, the optical sensor 366 may have a higher resolution, such as 1 Megapixel up to 10 or more Megapixels. The optical sensor 366 may be positioned such that images are taken of a user's face while the user holds the user device 104 in front of his face in a standard reading position. Therefore, the optical sensor 366 may be used to track user eye movement during reading.

In one embodiment, user device 104 includes one or more additional sensors 368 such as a physical contact sensor, close proximity sensors, or motion sensors. The sensors 368 can detect the presence of human body parts, and convey information regarding the detected presence to processor(s) 330. In one embodiment, the sensors 368 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 368 may also be optical (e.g., infrared) sensors that use an emitter and receiver pair to detect the presence of opaque objects. Alternatively, the sensors 368 may be inductive sensors, which include an inductive loop. When the presence of a human body part (or metal object) is brought close to the inductive sensor, an induction of the inductive loop changes, causing the human body part to be detected. Alternatively, the sensors 368 may be ultrasonic sensors that emit an ultrasonic signal and measure a time duration between when a signal is transmitted and the reflection of that signal received (a.k.a., flight response). The sensors 368 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 368 include a motion sensor, such as an accelerometer or one or more gyroscopes. The user device 104 may use motion data from motion sensors to determine whether a user is holding the user device 104. For example, if the user device 104 experiences constant minor accelerations, it may be determined that the user device 104 is being held in a user's hand. Additionally, if the user device 104 is at a particular angle (detectable based on acceleration readings from an accelerometer), it may be determined that the user device 104 is being rested on a user's leg during reading.

The processor(s) 330 may include sensor circuitry 335 (e.g., sensor device drivers) that enables the processor(s) 330 to interpret signals received from the optical sensor(s) 366 and/or additional sensors 368. In one embodiment, the optical sensors 366 and/or additional sensors 368 output raw sensor data. In another embodiment, the optical sensors 366 and/or additional sensors 368 output fully processed signals to the processor(s) 330. For example, the additional sensors 368 may output a user contact/no user contact signal using a single line interface or a multi-line interface. In another embodiment, the additional sensors 368 output, for example, positional data and/or object presence data (e.g., of a human body part) to the processors 330 without first processing the data. In either instance, the processors 330 may use the sensor circuitry 335 to process and/or interpret the received data. If data is received from multiple sensors, processing the data may include averaging the data, identifying a maximum from the data, or otherwise combining the data from the multiple sensors.

Figure 4:
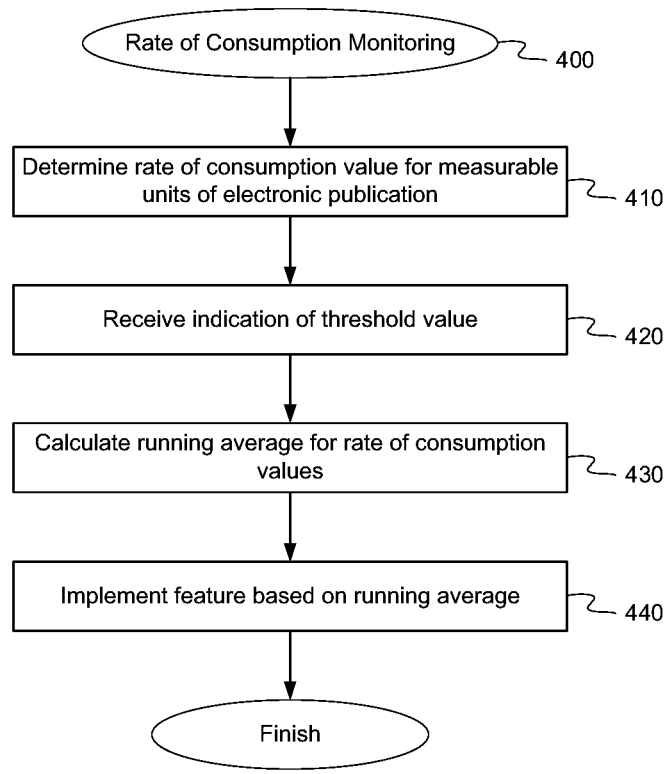
FIG. 4 is a flow diagram illustrating a rate of consumption monitoring method, according to an embodiment.

FIG. 4 is a flow diagram illustrating a rate of consumption monitoring method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to monitor the rate of consumption of an electronic publication by a user. In one embodiment, method 400 may be performed by rate of consumption monitoring module 135, as shown in FIG. 2.

Referring to FIG. 4, at block 410, method 400 determines a rate of consumption value for one or more measurable units of an electronic publication. As discussed above with respect to FIG. 2, reading behavior analyzing module 220 may use user reading behavior data 236 and electronic media data 240 from data store 242 to determine a rate of consumption value for a measureable unit of a current electronic publication. The rate of consumption value(s) may be stored as rate of consumption data 232 in data store 242. At block 420, method 400 receives an indication of a threshold value. The threshold value may represent an acceptable deviation from the current average (or previous) rate of consumption value. The threshold value may be stored as threshold data 234 in data store 242 and may be received by consumption rate monitoring module 135 as user input, as a selection from a list of choices, as a preprogrammed default value, etc.

At block 430, method 400 calculates a running average for the rate of consumption values. Reading behavior analyzing module 220 may compare each rate of consumption value to the threshold value before being included in the running average. For example, if a rate of consumption value deviates from the current average by more than a threshold amount (e.g., faster or slower by more than the threshold amount), then the reading behavior analyzing module 220 may disregard that value rather than including it in the running average. At block 440 method 400 implements a desired feature based on the running average calculated at block 430. One example of the feature may be an estimate of the time it will take the user to finish reading the current piece of electronic media. Reading behavior estimate module 230 may use electronic media data 240 and rate of consumption data 232 to calculate an expected remaining time based on the average rate of consumption and the number of measureable units remaining in the electronic publication.

Figure 5:
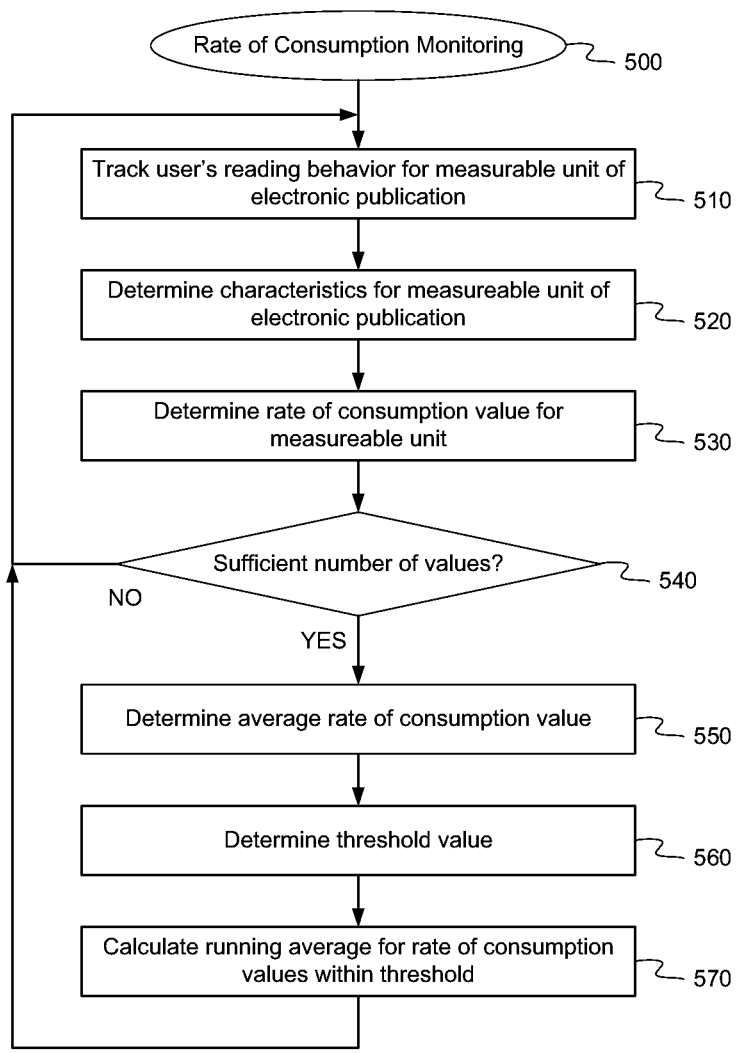
FIG. 5 is a flow diagram illustrating a rate of consumption monitoring method, according to another embodiment.

FIG. 5 is a flow diagram illustrating a rate of consumption monitoring method, according to an embodiment of the present invention. The method 500 may monitor the rate of consumption of an electronic publication by a user. The method 500 may provide additional details with reference to the method 400 of FIG. 4. In one embodiment, method 500 may be performed by rate of consumption monitoring module 135, as shown in FIG. 2.

Referring to FIG. 5, at block 510, method 500 tracks a user's reading behavior of a portion of text (e.g., a measurable unit) for the electronic publication. Reading behavior tracking module 210 may determine, using timer 248, how much time the user spends reading the measurable unit of the electronic publication. The timer 248 may be activated in response to user input, for example, by a turn page command, when the timer 248 would record the amount of time that a user spent on a particular page of the electronic publication, by an optical sensor, when the timer 248 would record the amount of time that the user spent actually looking at the screen of the user device, or by some other input. This time value may be stored as user reading behavior data 236 in data store 242.

At block 520, method 500 determines characteristics of the measureable unit of the electronic publication for which the user's reading behavior was tracked at block 510. Electronic media analyzing module 215 identifies factors that may affect the portion of content being measured. For example, electronic media analyzing module 215 may examine the electronic publication to determine a number of words displayed on a screen at one time. Electronic media analyzing module 215 may be configured to determine this directly from the electronic publication and store the information as electronic media data 240. In another embodiment, electronic media analyzing module 215 may obtain the information from electronic media data 240 in data store 242. Electronic media data 240 may be previously created by consumption rate monitoring module 135 or may be created by some other application or program. In other embodiments, electronic media analyzing module 215 may determine other information or characteristics of the electronic publication.

At block 530, method 500 determines a rate of consumption value for the measureable unit. Reading behavior analyzing module 220 may analyze user reading behavior data 236 and electronic media data 240 from data store 242 to determine a rate of consumption value (e.g., a reading speed). Using reading behavior data 236 and electronic media data 240, reading behavior analyzing module 220 may determine a rate of consumption value, which may be expressed, for example, in words per minute. In other embodiments, the rate of consumption value may be expressed differently. Reading behavior analyzing module 220 may determine a rate of consumption value for each measurable unit of the electronic media which was tracked at block 510. Reading behavior analyzing module 220 may store the rate of consumption value(s) as rate of consumption data 232 in data store 242.

At block 540 method 500 determines if the number of rate of consumption values determined at stored at block 530 has reached a determined number (i.e., if there are a sufficient number of values). The determined number may have a default value (e.g., 20, 30, 40), set by the manufacturer of the user device, or may be user configurable, such that the user may set the determined value. The determined number may be dynamic, such that is may be adjusted depending on the particular piece or type of electronic publication, on the user, etc. If method 500 determines that there are not a sufficient number of values, method 500 returns to block 510 and repeats the operations at blocks 510-530 until the determined number of rate of consumption values is reached or exceeded. If, at block 540, method 500 determines that there are a sufficient number of values stored in rate of consumption data 232, method 500 proceeds to block 550. In one embodiment, the determined number may be equal to one, such that the average rate of consumption is calculated or updated for every new rate of consumption value. In another embodiment, the comparison at block 540 is optional and may be omitted from method 500.

At block 550, method 500 determines an average rate of consumption value. Reading behavior analyzing module 220 uses all or a portion of the rate of consumption values to calculate an average. The average may be calculated as the arithmetic mean of the stored rate of consumption values in rate of consumption data 232, however in other embodiments, reading behavior analyzing module 220 may also calculate the median value, the mode value, or some other value. The calculated average rate of consumption value may also be stored in rate of consumption data 232 of data store 242.

At block 560, method 500 determines a threshold value. The threshold value may represent an acceptable deviation from the average rate of consumption value calculated at block 550. The threshold value may be stored as threshold data 234 in data store 242 and may be received by consumption rate monitoring module 135 as user input, as a selection from a list of choices, as a preprogrammed default value, etc. In one embodiment the threshold value may be set as a percentage of the average rate of consumption value (e.g., 10%, 20%) or a fixed value (e.g., 10 seconds, 30 seconds). Reading behavior analyzing module 220 may compare each subsequent rate of consumption value to the threshold and disregard values that fall outside of the threshold, either above or below the calculated average or a target rate of consumption.

At block 570, method 500 calculates a running average of the rate of consumption values that fall within the threshold established at block 560. Reading behavior analyzing module 220 may compare each rate of consumption value to the threshold value before being included in the running average. For example, if a rate of consumption value deviates from the current average by more than a threshold amount (e.g., faster or slower by more than the threshold amount), then the reading behavior analyzing module 220 may disregard that value rather than including it in the running average. In one embodiment, the running average stored in rate of consumption data 232 may be calculated for the one user and the current piece of electronic media being read. In another embodiment, another running average may be stored that includes rate of consumption values for multiple pieces of electronic media and/or multiple users.

Figure 6:
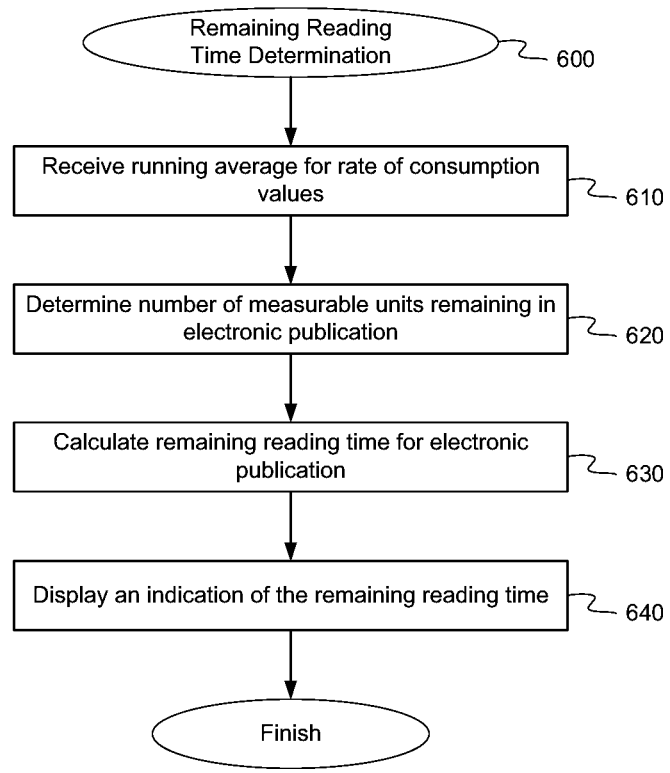
FIG. 6 is a flow diagram illustrating a remaining reading time determination method, according to an embodiment.

FIG. 6 is a flow diagram illustrating a remaining reading time determination method, according to an embodiment of the present invention. The method 600 may determine an estimated amount of time that it will take a user to finish reading at least a portion of an electronic publication or the entire publication. In one embodiment, method 600 may be performed by rate of consumption monitoring module 135, as shown in FIG. 2.

Referring to FIG. 6, at block 610, method 600 receives a running average of rate of consumption values for an electronic publication. The running average may be determined according to method 500 described above with respect to FIG. 5 and may be stored as rate of consumption data 232 in data store 242. Reading behavior estimate module 230 may request or automatically receive the running average from rate of consumption data 232.

At block 620, method 600 determines a number of measureable units remaining in at least the portion of the electronic publication or the entire publication. Reading behavior estimate module 230 may read electronic media data 240 to determine how many measureable units remain in the portion or the entire publication. The portion of the electronic publication may include, for example, the current page, chapter, number of pages/chapters/sections, the end of the electronic publication, or some other portion. The measurable units used in the estimate may be the same as the measureable units for which the rate of consumption values were calculated. If the user is partially through with the electronic publication, the number of measurable units remaining may be equal to the number of measurable units between the current location and the end of the publication. If the user has not begun reading the electronic publication, the number of measurable units remaining may equal the total number of measurable units in the publication.

At block 630, method 600 calculates a remaining reading time for the electronic publication. Reading behavior estimate module 230 may multiply the average rate of consumption value determined at block 610 by the number of measurable units remaining determined at block 620 to calculate the remaining reading time. At block 640, method 600 displays the remaining reading time, or other calculated value, in a user interface, on a display of the user device, as described below with respect to FIG. 7.

Figure 7:
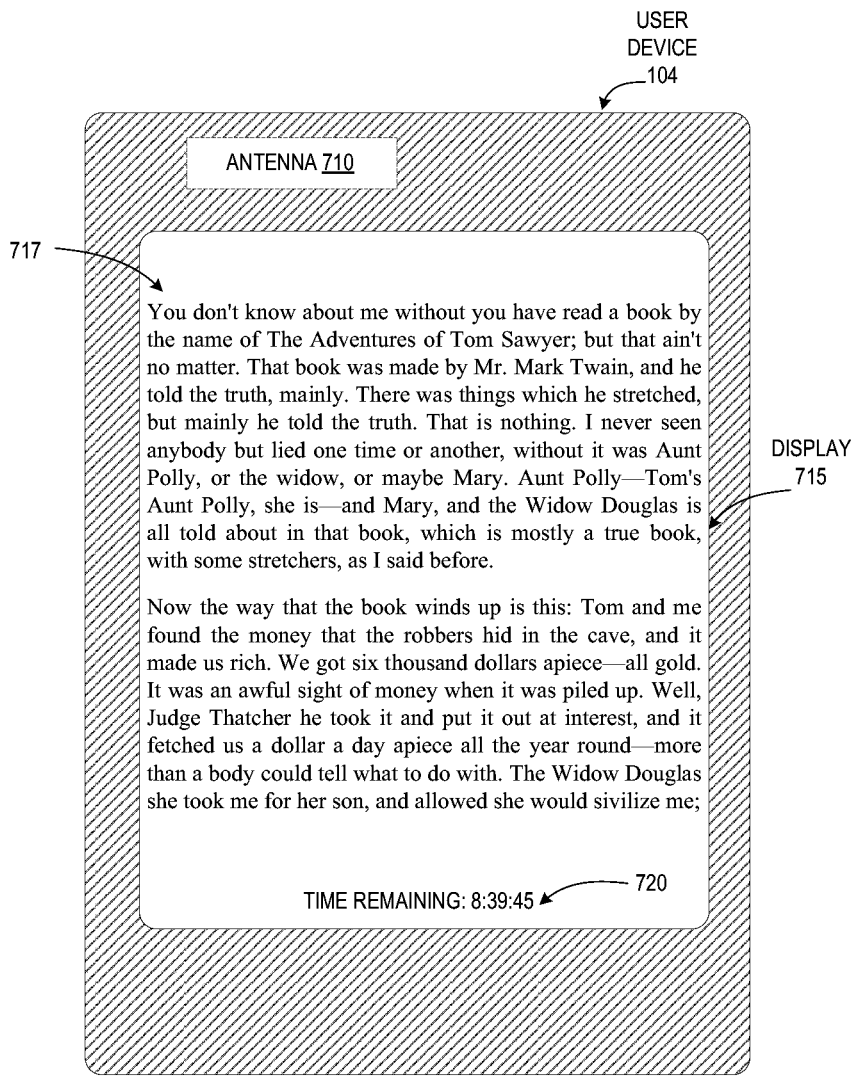
FIG. 7 illustrates a front side of a user device having a display, according to an embodiment.

FIG. 7 illustrates a front side of a user device 104 having a display 715. The user device 104 may be representative of any of the user devices 104, 153, 155 shown in FIG. 1. In on embodiment, user device 104 may include an antenna 710 disposed within a housing of the user device and above or below the display 715. Display 715 may display content to the user, such as an electronic publication. In one embodiment, a user interface, displayed on display 715 may include a text display area 717 and an indication 720 of a feature implemented by consumption rate monitoring module 135. In this embodiment, the user interface includes an indication 720 of the remaining reading time for the current electronic publication. The remaining reading time may be determined according to method 600, as discussed above. The user interface may be modified, automatically or in response to user input, to show different values (e.g., time remaining in the book, time remaining in the current chapter, current reading speed, etc.) This is merely one example of the features that may be implemented using the calculated rate of consumption vales, and one of skill in the art would recognize that there are many other possible applications or features for such data.

Embodiments of the present invention include various operations described herein. These operations may be performed by hardware components, software, firmware, or a combination thereof. Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a computer. The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A non-transitory computer-readable storage medium storing instructions which, when executed, cause a processing device to perform operations comprising:
   determining a rate of consumption value for each of a plurality of measurable units of an electronic publication being viewed on a user device, wherein determining the rate of consumption value for a measurable unit comprises at least one of starting a timer when the measurable unit is initially displayed on the user device and stopping the timer when a change page command is received, or starting the timer when a sensor determines that the user begins viewing the measurable unit on the user device and stopping the timer when the sensor determines that the user finishes viewing the measurable unit;
   calculating, by the processing device, a running average of the rate of consumption values, wherein the running average is updated based at least in part on a first rate of consumption value for a first measurable unit of the plurality of measurable units, and wherein a second rate of consumption value for a second measurable unit of the plurality of measurable units is excluded from the running average when the second rate of consumption value exceeds a threshold value; and
   providing a feature based on the running average.

2. The non-transitory computer-readable storage medium of claim 1, wherein determining a rate of consumption value for each of the plurality of measurable units comprises:
   tracking an amount of time each of the plurality of measurable units is displayed on a display of the user device;
   determining a number of measurable units displayed on the display; and
   calculating the rate of consumption value based on the number of measurable units and the amount of time.

3. The non-transitory computer-readable storage medium of claim 2, wherein the running average is calculated based on a determined number of reading speeds.

4. The non-transitory computer-readable storage medium of claim 1, wherein providing the feature comprises estimating an amount of time remaining for the user to complete consumption of at least a portion of the electronic publication.

5. The non-transitory computer-readable storage medium of claim 4, wherein estimating the amount of time remaining comprises:
   determining a number of measurable units remaining in at least the portion of the electronic publication; and
   multiplying the number of measurable units remaining by the running average of the rate of consumption values.

6. The non-transitory computer-readable storage medium of claim 1, wherein calculating the running average comprises:
   determining a new rate of consumption value for a subsequent measurable unit of the electronic publication; and
   updating the running average each time the new rate of consumption value is determined.

7. The non-transitory computer-readable storage medium of claim 1, wherein providing the feature comprises estimating a portion of the electronic publication which the user will consume in a pre-determined period of time.

8. The non-transitory computer-readable storage medium of claim 1, wherein providing the feature comprises automatically turning a page of the electronic publication after a period of time corresponding to a target rate of consumption value.

9. The non-transitory computer-readable storage medium of claim 1, wherein the running average is calculated using rate of consumption values from a plurality of electronic publications, and wherein the running average is weighted based on a level of difficulty of each of the plurality of electronic publications.

10. A system, comprising:
    a processing device;
    a display device coupled to the processing device; and
    a memory coupled to the processing device, the memory storing a consumption rate monitoring module, executed from the processing device and the memory, the consumption rate monitoring module configured to:
      determine a rate of consumption value for each of a plurality of measurable units of an electronic publication being viewed on a user device, wherein to determine the rate of consumption value for a measurable unit, the consumption rate monitoring module is configure to at least one of start a timer when the measurable unit is initially displayed on the user device and stop the timer when a change page command is received, or start the timer when a sensor determines that the user begins viewing the measurable unit on the user device and stop the timer when the sensor determines that the user finishes viewing the measurable unit;
      calculate a running average of the rate of consumption values, wherein the running average is updated based at least in part on a first rate of consumption value for a first measurable unit of the plurality of measurable units, and wherein a second rate of consumption value for a second measurable unit of the plurality of measurable units is excluded from the running average when the second rate of consumption value exceeds a threshold value;

provide a feature based on the running average; and display an indication of the feature on the display device.

11. The system of claim 10, wherein to calculate the running average, the consumption rate monitoring module is configured to:

determine a new rate of consumption value for a subsequent measurable unit of the electronic publication; and update the running average each time the new rate of consumption value is determined.

12. The system of claim 11, wherein the running average is calculated based on a determined number of rate of consumption values.

13. The system of claim 10, wherein the feature comprises an estimate of an amount of time remaining for the user to complete consumption of at least a portion of the electronic publication.

14. The method of claim 13, wherein to estimate the amount of time remaining, the consumption rate monitoring module is configured to:

determine a number of measurable units remaining in at least the portion of the electronic publication; and multiply the number of measurable units remaining by the running average of the rate of consumption values.

15. The system of claim 10, wherein to determine the rate of consumption value for each of the plurality of measurable units, the consumption rate monitoring module is configured to:

track an amount of time each of the plurality of measurable units is displayed on the display device;

determine a number of measurable units displayed on the display device; and calculate the rate of consumption value based on the number of measurable units and the amount of time.

16. The system of claim 10, wherein the running average is calculated using rate of consumption values from a plurality of electronic publications, and wherein the running average is weighted based on a level of difficulty of each of the plurality of electronic publications.

17. A method, implemented by a user device, comprising:

determining a reading speed of a user for each of a plurality of pages of an electronic publication being viewed on the user device, wherein determining the reading speed for a page comprises at least one of starting a timer when the page is initially displayed on the user device and stopping the timer when a change page command is received, or starting the timer when a sensor determines that the user begins viewing the page on the user device and stopping the timer when the sensor determines that the user finishes viewing the page;

calculating, by a processing device, a running average of the reading speeds, wherein the running average is updated based at least in part on a first reading speed for a first page of the plurality of pages, and wherein a second reading speed for a second page of the plurality of pages is excluded from the running average when the second reading speed exceeds a threshold value; and estimating, based on the running average, an amount of time remaining for the user to finish reading at least a portion of the electronic publication.

18. The method of claim 17, wherein calculating the running average comprises:

determining a new reading speed for a subsequent page of the electronic publication; and updating the running average each time the new reading speed is determined.

19. The method of claim 18, wherein the running average is calculated based on a determined number of reading speeds.

20. The method of claim 17, wherein determining the reading speed for each of the plurality of pages comprises:

tracking an amount of time each of the pages is displayed on a display of the user device;

determining a number of words displayed on the display for each of the pages; and calculating the reading speed based on the number of words per page and the amount of time.

21. The method of claim 17, wherein estimating the amount of time remaining comprises:

determining a number of pages remaining in at least the portion of the electronic publication; and multiplying the number of pages remaining by the running average of the reading speeds.

22. The method of claim 17, wherein the running average is calculated using reading speeds from a plurality of electronic publications, and wherein the running average is weighted based on a level of difficulty of each of the plurality of electronic publications.

* * * * *